Figure 1:
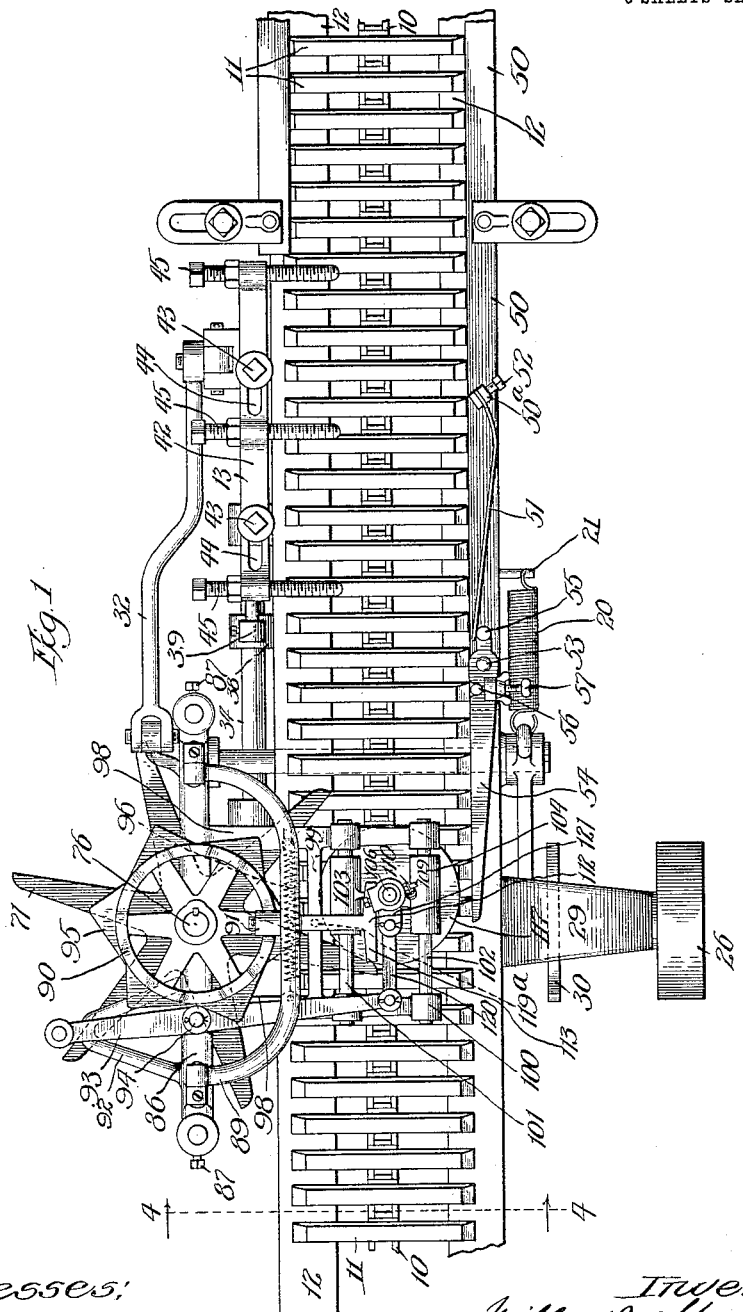

M. J. HAWKINS.
CAN TIPPING MACHINE.
APPLICATION FILED MAY 27, 1910.

1,053,990.

Patented Feb. 25, 1913.

6 SHEETS—SHEET 1.

Witnesses:
Geo. Davison
Henry M. ......

Inventor
Millard J. Hawkins
By Linthicum, Belt & Fuller
Attys

M. J. HAWKINS.
CAN TIPPING MACHINE.
APPLICATION FILED MAY 27, 1910.

1,053,990.

Patented Feb. 25, 1913.
6 SHEETS—SHEET 2.

Witnesses:
Geo. Davison
Henry M. Shipley

Inventor:
Millard J. Hawkins
By Smithers, Belt & Fuller
Att'ys.

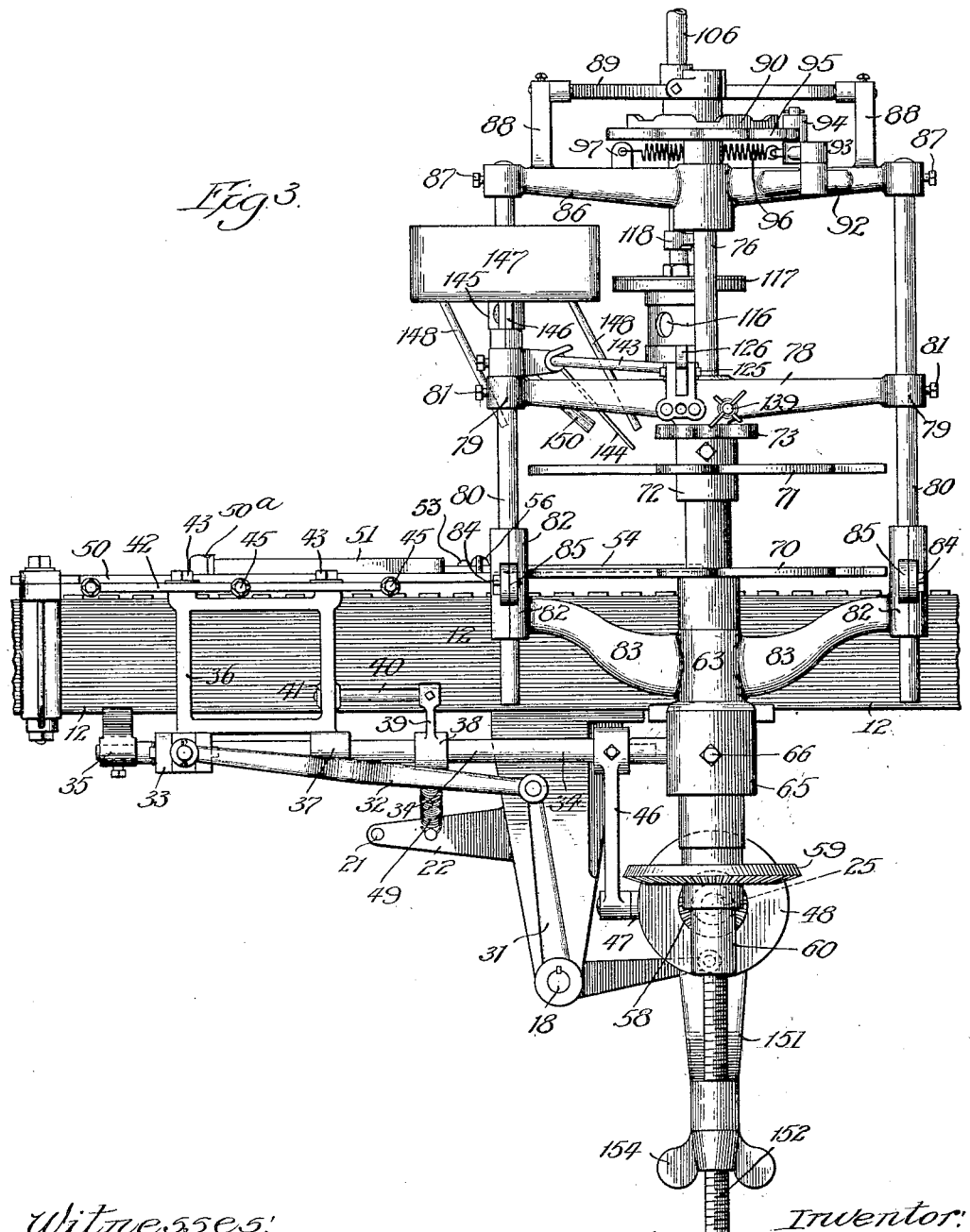

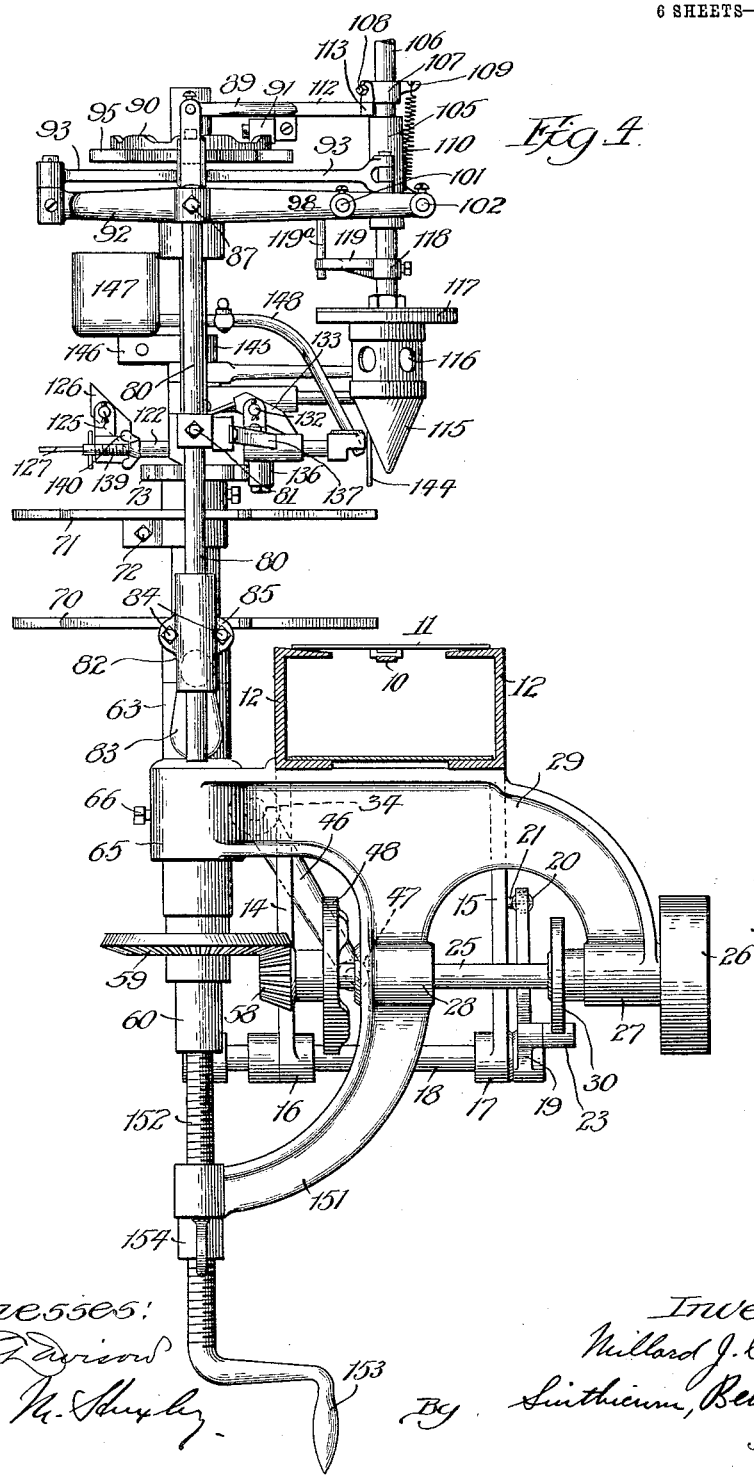

M. J. HAWKINS.
CAN TIPPING MACHINE.
APPLICATION FILED MAY 27, 1910.

1,053,990.

Patented Feb. 25, 1913.
6 SHEETS—SHEET 5.

Witnesses:
Inventor
Millard J. Hawkins
By Linthicum, Belt & Fuller
Attys.

M. J. HAWKINS.
CAN TIPPING MACHINE.
APPLICATION FILED MAY 27, 1910.
1,053,990.
Patented Feb. 25, 1913.
6 SHEETS—SHEET 6.
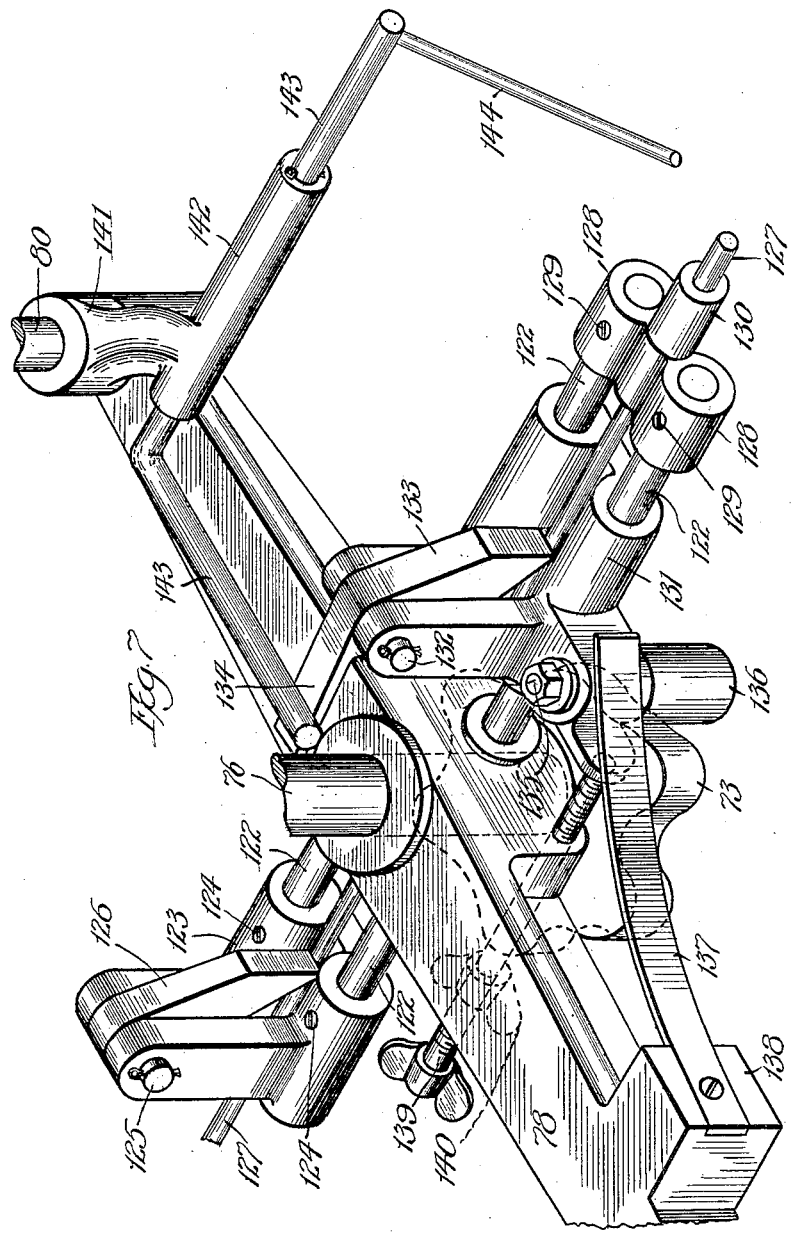
WITNESSES:
INVENTOR
Millard J. Hawkins
BY
Linthicum, Belt & Fuller
ATTORNEY

UNITED STATES PATENT OFFICE.

MILLARD J. HAWKINS, OF HOOPESTON, ILLINOIS.

CAN-TIPPING MACHINE.

1,053,990. Specification of Letters Patent. Patented Feb. 25, 1913.

Application filed May 27, 1910. Serial No. 563,798.

*To all whom it may concern:*

Be it known that I, MILLARD J. HAWKINS, a citizen of the United States, and a resident of Hoopeston, Vermilion county, Illinois, have invented certain new and useful Improvements in Can-Tipping Machines, of which the following is a specification.

My invention relates to can tipping machines, and has particular reference to a machine which is adapted to automatically close the small vent hole in the cover of the can after the same has been filled with material to be preserved.

Figure 2:
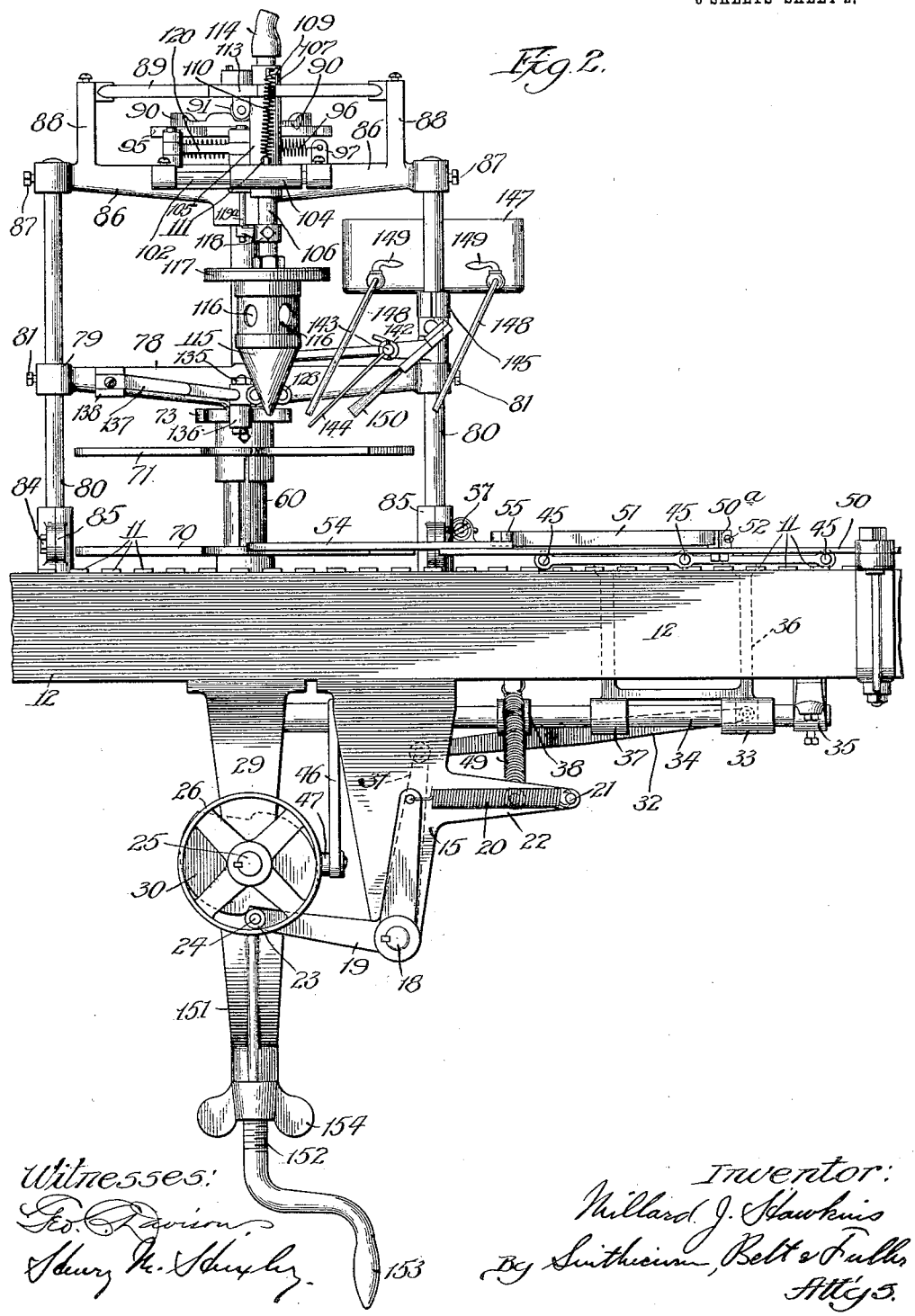
Figures 5, 6:
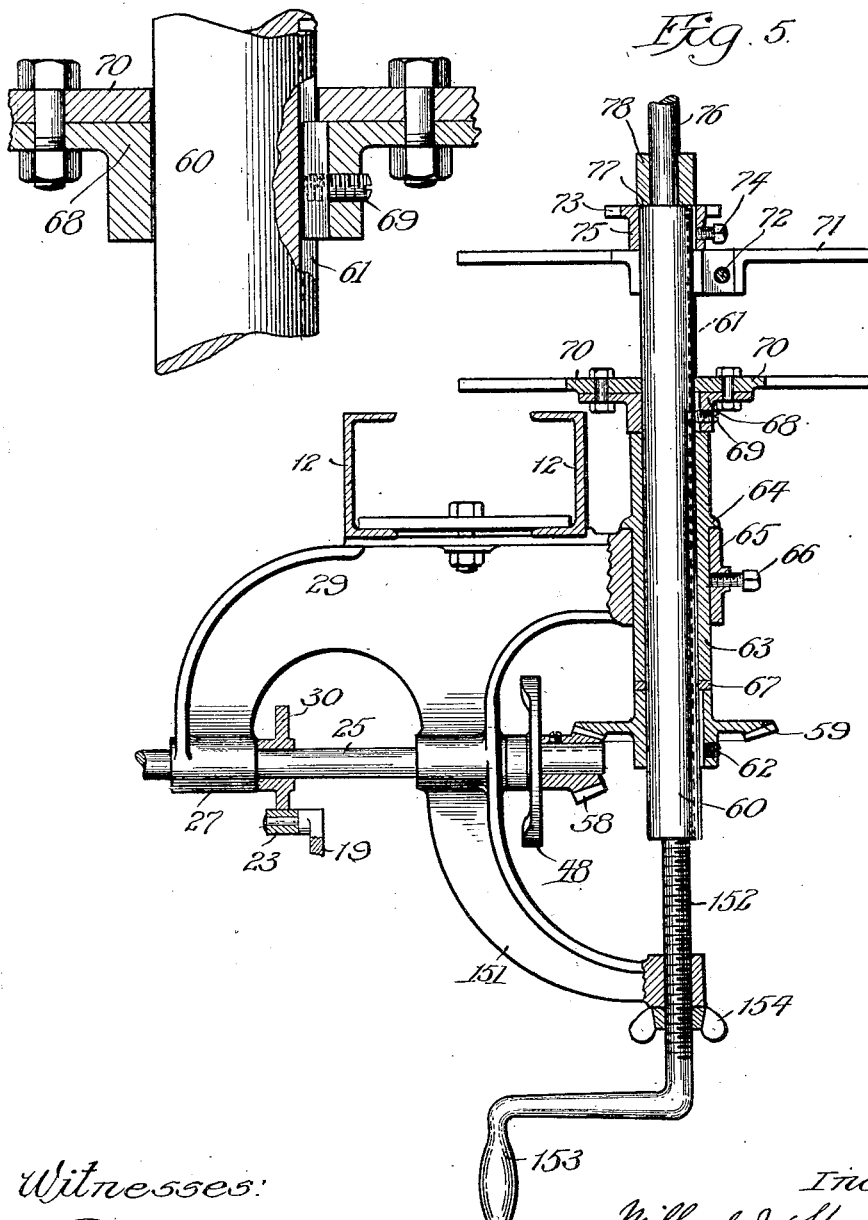

As is well known in the art, in one method of canning it is customary to place the hot material to be preserved inside of the can to which the cover is then applied and soldered in position. In order to make a ready application of the cover, it is necessary to leave a small vent hole at or near the center of the cover, and it is the object of my present invention to provide means for automatically closing this vent hole. I accomplish the desired result by means of providing an endless conveyer on which the cans are placed; this conveyer brings the cans successively beneath a soldering iron which is internally heated, at the same time mechanism being used for spacing the cans the correct distance apart, and for bringing the cans into the correct position so that when the soldering iron is lowered it will come in contact with the above mentioned vent hole in the cover of the can. Automatic means are also provided for applying acid or other suitable soldering compound to the cover in the vicinity of the vent hole, and the solder is also automatically fed to a position below the end of the soldering iron, the feeding of the solder being interrupted when the series of cans which are being fed by the soldering iron is interrupted. As one of the cans passes below the soldering iron, means is provided by which the soldering iron is depressed until it comes into contact with the cover of the can, and the soldering iron then travels for a short distance with the can until the soldering operation is completed. Not only is this the case, but by means of a suitable pin and lever, the soldering iron is turned on its longitudinal axis so that the soldering operation is made more effective. The exact means by which I accomplish the above mentioned results will be more clearly understood by reference to the accompanying drawings which represent a preferred embodiment of my invention and in which:

Figure 1 is a plan view of my improved can tipping machine. Fig. 2 is a fragmentary front elevation of the machine shown in Fig. 1. Fig. 3 is a rear elevation of the parts shown in Fig. 2. Fig. 4 is an end elevation and partly sectional view on the line 4—4 of Fig. 1. Fig. 5 is a fragmentary vertical section showing the main operating shaft and the parts connected therewith. Fig. 6 is an enlarged fragmentary vertical sectional view showing a portion of the main shaft. Fig. 7 is a perspective view showing the solder feeding mechanism.

The endless chain 10 is driven by a pair of sprocket wheels, which for the sake of simplicity, are not shown in the drawings. Mounted on the chain 10, are a plurality of transverse bars 11 which are carried by the chain 10 along the upper surface of the channels 12, 12. The cans having covers with vent holes which are to be closed, are placed on the bars 11 at the right hand end of the mechanism as shown in Fig. 1, and are thereby carried toward the left. In order to have the various operations follow each other in the proper sequence, it is necessary that these cans be spaced apart the proper distance. In order to perform this operation, a spacer 13 is provided, the various parts of which will next be described.

Projecting downwardly from the two channels 12, 12, are the brackets 14 and 15, the lower ends of which have the bearings 16 and 17, respectively. Passing through these bearings, is a shaft 18, on the outer or front end of which is mounted the bell-crank-lever 19. To the end of the arm of this bell-crank-lever, is attached the extension spring 20 which is fastened at its other end to the pin 21 on the projection 22 of the bracket. The horizontal arm of the bell-crank-lever 19 has on its end, the roller 23, mounted on the pin 24.

On the end of the main driving shaft 25, is mounted a pulley 26, which is driven by means of a suitable belt connected with the source of power. Also mounted on the same shaft, which passes through the bearings 27 and 28 in the main frame 29 of the machine, is a cam 30 best shown in Fig. 2. Mounted on the end of shaft 18 opposite to that on which the bell-crank-lever is mounted, is the lever 31 which has pivotal connection with a link 32. The link 32 in turn, is pivotally connected with the sleeve 33 which is slidably mounted on the shaft 34, this shaft being rotatably mounted at its ends in the bracket 35 and the main frame 29. The sleeve 33 is made integral with the frame 36 to which is also connected the sleeve 37, also slidably mounted on the shaft 34.

Rigidly mounted on the shaft 34 is the collar 38 on which is an upwardly extending arm 39. A short shaft 40 extends horizontally from the arm 39 and passes through a bearing 41 in the frame 36. A horizontal bar 42 is connected with the frame 36 by means of the bolts 43, 43, the bar 42 having slots 44 so that the bar may be adjusted in the desired position with relation to the frame 36. Mounted in the bar 42 are the spacing screws 45.

It will now be apparent that as the main shaft 25 is rotated, the cam 30 will cause the horizontal end of the bell-crank-lever 19 to be forced downwardly against the pressure of the extension spring 20. The movement of this bell-crank-lever will transmit the motion to the shaft 18 and from thence through the lever 31 and the link 32, to the frame 36, thus causing this frame to reciprocate in a direction parallel to that of the channels 12, 12. Rigidly mounted on the shaft 34, is the lever 46, on the end of which is mounted the roller 47. This roller engages the cam 48 which is rigidly mounted on shaft 25. The spring 49 is attached to the front of the arm 39 and is attached at its opposite end to the extension 22 of the bracket 15. It is thus clear that spring 49 will tend to hold the roller 47 in contact with the cam 48. As shaft 25 rotates, the lever 46 will be moved in a backward and forward direction, thereby serving to rock shaft 34. The collar 38 being rigidly mounted on this shaft, the rotation of the same will be transmitted through the short shaft 40 to the frame 36 which will thus be moved in a backward and forward direction about shaft 34 as an axis at the same time that it is moved longitudinally by the action of the link 32 and its connected parts.

Rigidly mounted on the channel lying toward the front of the machine is the rod 50 to which the spring holder 50ª is fastened. A spring 51 is retained in spring holder 50ª by means of a set-screw 52. Pivotally mounted on the pin 53, is a lever 54, on the right hand end of which, as shown in Fig. 1, is mounted the pin 55 against which the spring 51 has its bearing. The pin 56 mounted on the rod 50 controls the movement of the lever 54 by the spring 51, exact adjustment being obtained by means of the set-screw 57 which is suitably mounted on the lever 54, the function of which will be explained hereafter.

Mounted on the end of shaft 25 is the bevel gear 58 which is in mesh with the bevel gear 59, which in turn, is loosely mounted on the shaft 60. As most clearly shown in Fig. 5, the shaft 60 is provided with a slot 61 running through its entire length. In the collar of the bevel gear 59, is the set-screw 62, the end of which engages in the slot 61, thereby causing the shaft 60 to rotate with the bevel gear 59. A sleeve 63 having a flange 64, is carried by the inclosing portion 65 of the main frame 29, sleeve 63 being securely held in position by means of the set-screw 66. A bearing ring 67 is placed between the bevel gear 59 and the stationary sleeve 63. Mounted on the upper end of sleeve 63 is the collar 68 which has the set-screw 69 engaging the slot 61 in shaft 60. Rigidly bolted to the collar 68 is a lower spider 70 which is thus caused to rotate with the collar 68. The upper spider member 71 is longitudinally split through one side of its hub and is fastened rigidly to the shaft 60 by means of the bolt 72. The cam 73 is fastened to the shaft 60 by the set-screw 74 passing through the hub 75. The upper portion 76 of the shaft 60 is of smaller diameter than the lower portion of the same shaft. Bearing on the shoulder 77 between the portion 76 of the shaft 60 and the main portion of the same shaft, is the cross arm 78, the ends of which are loosely mounted by means of their bearings 79, 79 on the upright shafts 80, 80. The arm 78 is secured in its desired position on the shafts 80, 80, by means of set-screws 81, 81. The lower ends of shafts 80, 80, pass loosely through the bearings 82, 82 of the arms 83, 83, which are carried by the sleeve 63. The tension of the bearings 82, 82 may be regulated by means of the bolts 84, 84 passing through the projections 85, 85.

The upper end of the portion 76 of shaft 60, has its bearings in the cross arm 86, the ends of which are secured to the shafts 80, 80 by means of the set-screws 87, 87. Extending upwardly from the cross arm 86 are the two uprights 88, 88, to which are pivotally secured the ends of the frame 89, best shown in Fig. 1. Mounted near the upper end of shaft 76 is a cam 90 which is engaged by the roller 91, secured to the frame 89.

Extending to the rear from the cross arm 86, is the arm 92 on the end of which is pivotally mounted a link 93 which is provided with the roll 94 adapted to engage the periphery of the star shaped cam 95 which is mounted on shaft 76 just below the cam 90. A spring 96 is attached to the link 93 and is connected at its opposite end to the bracket 97 on the arm 98 extending forwardly from the cross arm 86. By means of this spring 96 it will be apparent that the roller 94 on the link 93 will be held in contact with the periphery of the star shaped cam 95.

A second arm 98 corresponding to the arm 98 just mentioned, which bears the bracket 97, also extends forwardly from the cross arm 86, these two arms being connected by means of a cross member 99. Integral with the arms 98, 98 are the collar members 100 which retain between them the two parallel shafts 101 and 102. Slidably mounted on these shafts, are the sleeves 103 and 104, which carry between them upright sleeve 105. Through this latter sleeve passes the shaft 106, rigidly mounted on which is the collar 107 held in position by the set-screw 108. A lug 109 projects from this collar and is adapted to receive one end of the extension spring 110, the other end of which is mounted on the bracket 111 connected with the sleeve 104. Extending forwardly from the frame 89, is the T 112 having the longitudinal head 113. This head 113, when the roll 91 is in a depression on the cam 90, is adapted to engage the top of sleeve 105, and when frame 89 and the T are carried upwardly by the projections on the same cam, the collar 107 also engaged by the head 113, is carried upwardly, thereby also raising the shaft 106; as cam 90 is rotated, shaft 106 is thereby caused to reciprocate up and down. The shaft 106 is hollow and its end is connected with a flexible pipe 114 which leads to a source of gas. Rigidly mounted on the lower end of shaft 106, is the soldering iron 115 which is hollow and supplied with gas through the hollow shaft 106. As shown, this soldering iron is pointed on its lower end and is provided with openings 116 by means of which air is supplied to the gas and through which the products of combustion escape. A disk 117 occupies a position above the soldering iron 115 and is for the purpose of preventing the gas from passing upwardly from the various parts of the machine which have just been described.

Mounted on shaft 106 is the collar 118 integral with which is the arm 119 having a slot in its end which is adapted to engage the pin 119ª projecting downwardly from the T 112. The link 120 connects the end of link 93 with the extension 121 of the sleeve 105, so that as the link 93 is moved laterally, the sleeve 105 and the two sleeves 103 and 104, mounted on the shaft 101 and 102, respectively, are also given a lateral movement.

We will now describe the various mechanisms for feeding the materials connected with the soldering operation to the top of the can to be soldered. The mechanism for feeding the solder itself, as most clearly shown in Fig. 7, is mounted on the two shafts 122, 122 which extend through the lower cross arm 78. On the rear end of shafts 122, 122 is mounted the bracket 123, which is securely held in position by the set-screws 124, 124. Loosely mounted on the pin 125 of the bracket 123 is the dog 126, the edge of which engages the solder 127 which is preferably in the form of a wire and is fed to the machine from a suitable spool or reel. On the front end of the two shafts 122, 122, is mounted the double collar 128 held in position by the set-screws 129, 129. Between the two sides of this double collar, is the guide 130, through which the solder 127 passes. Slidably mounted between the double collar 128 and the front surface of the cross arm 78, is the bracket 131 which carries on the pin 132, the dog 133 having the rearward extension 134. Mounted on pin 135 of the bracket 131, is the roll 136 which is adapted to engage the periphery of the cam 73. The spring 137, mounted on the boss 138 of the cross arm 76, engages the bracket 131 and tends to force it toward the rear. The screw 139, having the lock-nut 140 thereon, passes through the cross arm 78 and its end is adapted to limit the movement of the bracket 131 in a rearward direction. Mounted on the shaft 80 is a collar 141 integral with which is the sleeve 142. Through this sleeve passes the rod 143 which is bent to engage the rearward extension 134 of the dog 133. Mounted toward the front of the rod 143 is the arm 144 which is adapted to be engaged by the cans which are carried along on the cross members 11 of the conveyer. It will now be clear that as the shaft 60 with the cam 73 mounted thereon is rotated, the bracket 131 will be reciprocated backward and forward, and at each movement forward, the solder 127 will be carried forward by engagement of the dog 133 therewith, backward movement of the solder by movement of the bracket 131 in a backward direction being prevented by means of the dog 126. When one of the cans, however, does not engage the arm 144, thereby causing the rod 143 to be disengaged from extension 134 of the dog 133, the weight of this rod 143 will cause the dog 133 to be lifted from engagement from the solder wire 127 and reciprocation of the bracket 131 will have no effect in moving forward the strip of solder. Also mounted on the shaft 80 is the collar 145 which projects to form the seat 146 for an acid tank 147. Connected with this tank 147 are the two pipes 148, 148 which are controlled by the cocks 149, 149. Also suitably mounted on the shaft 80, is the brush 150, the object of which will be explained hereafter.

Mounted in the end of the arm 151, passing downwardly from the main frame 29, is the threaded rod 152 on the end of which is the crank 153. As clearly shown in Fig. 5, the end of rod 152 engages the shaft 60 which may thus be raised or lowered as desired by turning the crank 153. A set-screw 154 is provided which locks the rod 152 in any desired position.

Having thus described the construction of the improved machine of my invention, the operation of the same may now be readily understood.

As previously explained, the cans in which the hot material to be preserved is placed, are provided with covers which have at or near their centers small vent holes. These cans are placed on the transverse bars 11 and carried to the left, as illustrated in Fig. 1, by the action of the endless chain 10. The spacer 13 is given a compound motion in that it is carried toward the left in the view shown in Fig. 1 by means of the link 32 and its associated parts, and on reaching the position at the extreme left of its travel, the lever 46 causes the shaft 34 to rotate and move the spacer in a backward direction withdrawing the spacing screws 45 from their position between the cans. The spring 20 then draws the spacer to the right, and on release of the roll 47 from the projections on the cam 48, the spacer again moves forward and the spacing screws 45 resume the position shown in Fig. 1. The cans are now carried still farther to the left, and are brought into contact with the lever 54 which serves, by means of its actuating spring 51, to force the cans backward into one of the angles formed between the arms of the spiders 70 and 71. The upper spider 71 is given its proper adjustment by means of turning the crank 153 which elevates or lowers the shaft 60 which thereby serves to simultaneously elevate or lower the two shafts 80, so that the soldering iron 115, the brush 150 and the pipes 148 are all brought into the proper positions according to the height of the series of cans which are to be tipped. As one of the cans passes into the angle between the arms of the spiders 70 and 71, a small amount of muriatic acid or other suitable soldering flux is dropped onto the top of the can, and the brush 150 then serves to properly smear the flux in the form of a thin coating over that portion of the can in which the vent hole is placed. The can next strikes the arm 144, thereby raising the end of the rod 143 which engages the dog 133. The action of the cam 73, mounted on the shaft 60, now serves to actuate the solder feeding mechanism and the end of the solder wire 127 is placed in a position directly over the vent hole in the cover of the can. By the action of the cams 90 and 95, the soldering iron 115 is first depressed until it comes in contact with the solder directly over the hole in the cover of the can, and then moved along to the left so that it remains in contact with the cover of the can for a short distance during the further travel of the same to the left. Not only does the soldering iron travel with the can in this manner, but by means of the pin 119$^a$ coöperating with the arm 119, the soldering iron is given a rotary motion and thus the soldering action is more effectually carried out. As the various cans pass in series below the soldering mechanism, the same cycle of operations is repeated, the cans after they have been tipped being delivered from the left hand end of the machine. In case the series of cans is interrupted, there is no waste of solder, as previously explained, for the reason that the arm 144 remains in its depressed position, thereby causing the end of the rod 143 to rest on the dog 133 and disengaging the latter from the solder wire 27.

It will be apparent to those skilled in the art that many changes could be made in the detailed construction of the parts which I have described without departing from the spirit of my invention. For example any suitable type of conveyer may be used which will serve to bring the cans into a position in which the soldering iron will operate on the same. Similarly the spacing device and other parts of the machine could be modified to a considerable extent which will readily occur to those skilled in the art.

What I claim is:

1. In a device of the class described, the combination of a soldering iron, means for conveying to said iron a can to be tipped, means for supplying solder to the iron, means for bringing said iron into contact with said can, thereby closing the vent hole in the can, means for moving said iron with said can, thereby prolonging its contact with the can and facilitating the soldering operation, and means for rotating said soldering iron during its travel with said can, substantially as described.

2. In a device of the class described, the combination of a conveyer for a plurality of cans to be tipped, means for actuating said conveyer, a shaft, a spider mounted on said shaft, means for successively bringing said cans into contact with said spider, a soldering iron, a cam mounted on said shaft and adapted to cause reciprocation of said iron in a vertical plane, thereby bringing the iron into contact with the covers of successive cans held by said spider, a second cam mounted on said shaft and adapted to cause reciprocation of said iron in a horizontal plane, thereby causing the soldering iron to successively travel with said cans, and means for supplying solder to said iron, substantially as described.

3. In a device of the class described, the combination of a soldering iron, means for successively conveying to said iron a plurality of cans to be tipped, a shaft, supporting means for said soldering iron loosely mounted on said shaft, means for causing the vertical reciprocation of said soldering iron, means for causing the horizontal reciprocation of said soldering iron, a spider mounted on said shaft and rotated thereby, means for forcing the said cans successively into contact with said spider, and means for moving said shaft longitudinally, thereby vertically adjusting the position of said soldering iron according to the height of the cans which are successively brought into contact with said spider, substantially as described.

4. In a device of the class described, the combination of a conveyer for a plurality of cans to be tipped, and a spacing device operating on said cans, said spacing device comprising a frame, spacing means extending laterally from said frame, cam mechanism for moving said frame in a direction parallel to said conveyer, and cam mechanism for moving said frame in a direction substantially at right angles to said conveyer thereby arranging said cans at predetermined distances from each other on said conveyer, substantially as described.

5. In a device of the class described, the combination of a conveyer for a plurality of cans to be tipped and a spacing device adapted to operate on said cans, said spacing device comprising a substantially vertical frame, a plurality of substantially horizontal spacing members extending over said conveyer, a shaft on which said frame is mounted, cam mechanism for moving said frame in a direction parallel to said conveyer, and cam mechanism for rotating said shaft thereby moving said spacing members in a direction substantially at right angles to said conveyer, said spacing device thereby serving to arrange the cans on said conveyer at predetermined distances from each other, substantially as described.

6. In a device of the class described, the combination of a conveyer for a can to be tipped, a rotatable shaft, a vertically adjustable frame, an arm pivoted to said frame, a cam mounted on said shaft for actuating said arm, a soldering iron mounted on said arm, a supporting member laterally projecting from said frame and having a shaft thereon substantially parallel to said conveyer, a sleeve movable on said shaft, means connecting said sleeve with said soldering iron, and cam mechanism mounted on said rotatable shaft for moving said soldering iron in a direction parallel with said conveyer, substantially as described.

7. In a device of the class described, the combination of a conveyer for a plurality of cans to be tipped, a frame, a soldering iron mounted on said frame, means for moving said soldering iron in a direction parallel to said conveyer, an arm associated with said soldering iron to move therewith, and means mounted on said frame for engaging said arm, movement of said soldering iron in a direction parallel with said conveyer thereby causing rotation of said iron on its own axis, substantially as described.

8. A can tipping machine, comprising a conveyer, a soldering implement mounted to travel forward and back along the path of said conveyer, and mechanism for rotating said soldering implement about its own axis while it is moving with said conveyer, substantially as described.

9. In a can tipping machine, the combination of a soldering implement, a conveyer adapted to carry cans in succession into position for engagement with said implement, mechanism controlling the movement of said soldering implement and adapted to carry it forward and back along the path of said conveyer and into and out of engagement with successive cans, said mechanism comprising means for causing said implement to travel with each can while in engagement therewith and to be simultaneously rotated about the axis of said implement to insure accurate registration with the vent-holes of the cans.

10. In a can tipping machine, the combination of a soldering implement, a conveyer adapted to carry cans in succession into position for engagement with said implement, mechanism controlling the movement of said soldering implement and adapted to carry it forward and back along the path of said conveyer and into and out of engagement with successive cans, said mechanism comprising means for causing said implement to travel with each can while in engagement therewith, and means for causing a relative rotation of said can and soldering implement with respect to the axis of one of them, substantially as described.

11. In a device of the class described, the combination of a conveyer for cans to be tipped, means for actuating said conveyer, a can spacing frame, a pair of cams, actuating means for said cams, and means for operatively connecting said spacing frame with said cams, one of the cams adapted to reciprocate the spacing frame in one direction and the second cam adapted to reciprocate the spacing frame in a second direction substantially at right angles to said first direction, substantially as described.

In witness whereof, I hereunto subscribe my name this 24th day of May, A. D. 1910.

MILLARD J. HAWKINS.

Witnesses:
JOHN B. WALLBRIDGE,
CECIL YOUNG.